United States Patent Office 3,084,136
Patented Apr. 2, 1963

3,084,136
INTERPOLYMERS OF ALLYL ALCOHOL, VINYL CHLORIDE AND ACRYLIC ESTERS, PROCESS OF PREPARING SAME AND COATING COMPOSITION THEREFROM
Earl C. Chapin, Springfield, and Barbara A. Wilson, Amherst, Mass., and William F. Yates, Texas City, Tex., assignors to Monsanto Chemical Company, St. Louis, Mo., a corporation of Delaware
No Drawing. Filed Dec. 12, 1958, Ser. No. 779,864
9 Claims. (Cl. 260—45.2)

This invention relates to new terpolymer systems. More particularly, the invention relates to terpolymer systems containing alcohol groups.

One object of this invention is to provide polymeric systems containing alcohol groups.

Another object is to provide terpolymer systems containing chlorine atoms, ester groups and alcohol groups.

These and other objects are obtained by copolymerizing vinyl chloride with an acrylic ester and an allyl alcohol at elevated temperatures under autogenous pressure.

The following examples are given in illustration of the invention and are not intended as limitations thereof. Where parts are mentioned, they are parts by weight.

*Example I*

Mix together 30 parts of allyl alcohol monomer, 20 parts of vinyl chloride monomer, 50 parts of ethyl acrylate monomer and 3 parts of ditertiarybutyl peroxide. Heat the mixture in a closed pressure vessel at a temperature of 120° C. for about 30 minutes. The product is a clear, nearly colorless syrup comprising terpolymer dissolved in unreacted monomers. Remove the unreacted monomers by vacuum distillation to obtain a clear, tough solid terpolymer soluble in hot xylene-butanol mixtures. The terpolymer contains about 6.5% of combined vinyl chloride by weight as determined by chlorine analysis. Infrared analysis indicates the presence of ester groups and primary hydroxyl groups in the terpolymer. Analysis for hydroxyl groups shows the terpolymer to contain about 6% by weight of hydroxyl groups, corresponding to an allyl alcohol content of about 20% by weight.

*Example II*

Mix together 30 parts of allyl alcohol monomer, 50 parts of vinyl chloride monomer, 20 parts of ethyl acrylate monomer and 3 parts of ditertiarybutyl peroxide. Heat the mixture in a closed pressure vessel at a temperature of 120° C. for about 2 hours. The product is a clear, nearly colorless syrup comprising terpolymer dissolved in unreacted monomers. Remove the unreacted monomers by vacuum distillation to obtain a clear, tough solid terpolymer soluble in hot xylene-butanol mixtures. The terpolymer contains about 28.6% of combined vinyl chloride by weight as determined by chlorine analysis. Infrared analysis indicates the presence of ester groups and primary hydroxyl groups in the terpolymer. Analysis for hydroxyl groups shows the terpolymer to contain about 5% by weight of hydroxyl groups, corresponding to an allyl alcohol content of about 17% by weight.

*Example III*

Mix together 30 parts of allyl alcohol monomer, 60 parts of vinyl chloride monomer, 10 parts of 2-ethylhexyl acrylate monomer and 3 parts of ditertiarybutyl peroxide. Heat the mixture in a closed pressure vessel at a temperature of 120° C. for about 2 hours. The product is a clear, nearly colorless syrup comprising terpolymer dissolved in unreacted monomers. Remove the unreacted monomers by precipitation in excess methanol to obtain a clear, soft solid terpolymer soluble in xylene-butanol mixtures. The terpolymer contains about 41.6% of combined vinyl chloride by weight as determined by chlorine analysis. Infrared analysis indicates the presence of ester groups and primary hydroxyl groups in the terpolymer. Analysis for hydroxyl groups shows the terpolymer to contain about 3% by weight of hydroxyl groups, corresponding to an allyl alcohol content of about 10% by weight.

The three components of the terpolymers of this invention are (1) allyl alcohol of methallyl alcohol or mixtures thereof, (2) vinyl chloride, and (3) an ester of acrylic acid. The allyl alcohol component may vary from 5–40% by weight of the terpolymer, the vinyl chloride component from 5–60% by weight and the acrylic ester component 2–73.5% by weight. The acrylic ester component comprises alkyl esters of acrylic acid in which the alkyl group may contain up to about 12 carbon atoms either in a straight or branch chain. Examples of suitable acrylic esters include methyl acrylate, ethyl acrylate, n-butyl acrylate, tertiarybutyl acrylate, 2-ethylhexyl acrylate, etc. Mixtures of such acrylic esters may also be used.

In preparing the terpolymers of this invention, the three types of monomeric components should be mixed together with a free radical initiator and the mixture should then be heated at a temperature of from 80–160° C. in a closed reaction vessel under autogenous pressure. Generally, the reaction mixture will comprise from 10–70 parts of the allyl alcohol component, from 10–70 parts of vinyl chloride and from 2–50 parts of acrylic ester, all parts being parts by weight based upon 100 parts of total monomers. The reaction should be run for from 15 minutes to 4 hours to obtain conversions ranging from 10–80% depending upon the conditions chosen. If desired, the monomers may be mixed with an inert solvent such as xylene before the polymerization step.

The polymerization reaction may be thermally initiated but it is preferred to use a free radical polymerization initiator such as ditertiarybutyl peroxide, ditertiarybutyl hydroperoxide, tertiarybutyl perbenzoate, pinacolone peroxide, hydrogen peroxide, etc. To be effective, the amount of initiator should be between about 0.1 part and 3 parts per 100 parts of total monomers.

The polymerization products are generally syrupy liquids which comprise a solution of the terpolymer dissolved in unreacted monomers and solvent if a solvent is used. The terpolymer is easily recovered from the syrup by removing unreacted monomers and solvent either by vacuum distillation or by precipitating the polymer in a non-solvent such as methanol. The terpolymers are generally tough, rather soft materials having little or no color. They contain from about 1.5 to about 12% hydroxyl groups by weight. Those containing from about 3 to 8% hydroxyl groups by weight are preferred.

The products of this invention are particularly useful in coating compositions as a main resin constituent thereof, with relatively minor amounts of other coating resins such as alkyd resins, phenol-, urea- and melamine-formaldehyde coating resins, epoxy resins, etc. The terpolymers may also be used in relatively small amounts as modifiers for other coating resins. Furthermore, they may be esterified with drying oil acids to produce resins which will air-dry. Among the most valuable coating compositions are the resins of this invention mixed with a minor amount of a methylol melamine ether.

*Example IV*

Prepare a 50% solids by weight solution of the terpolymer of Example I dissolved in a 1:1 xylene-butanol mixture and a 50% solids by weight solution of a trimethylol melamine butyl ether dissolved in a 1:1 xylene-butanol mixture. Mix together 4 parts of the terpolymer solution and 1 part of the melamine ether solution to obtain a clear homogenous solution. From this solution, cast a film on a clean glass plate, dry the film in air at room temperature for a few minutes, e.g., 20 minutes, and then heat the film at 150° C. for about 20 minutes. The cured film is hard, clear and insoluble in aromatic solvents and in 10% aqueous sodium hydroxide solution.

Various pigments, fillers, dyes and other conventional additives may be added to the solutions such as that of Example IV to yield coating compositions. Other organic solvents than xylene-butanol mixtures may be used, e.g., ketones such as cyclohexanone and methyl ethyl ketone, aromatic hydrocarbons such as toluene and mixtures of xylene or toluene with aliphatic alcohols such as methanol, etc.

It is obvious that many variations may be made in the products and processes of this invention without departing from the spirit and scope thereof.

What is claimed is:

1. A terpolymer consisting of (1) 5–60% by weight of vinyl chloride, (2) 5–40% by weight of an allyl alcohol component of the group consisting of allyl alcohol, methallyl alcohol, and mixtures thereof, and (3) 2–73.5% by weight of an acrylic ester component of the group consisting of an alkyl acrylate wherein the alkyl group contains 1–12 carbon atoms and mixtures thereof; said terpolymer having been prepared by heating a mixture consisting of 10–70% by weight of vinyl chloride, 10–70% by weight of the allyl alcohol, and 2–50% by weight of the acrylic ester at 80–160° C. under autogenous pressure.

2. A terpolymer of claim 1 wherein the allyl alcohol component is allyl alcohol.

3. A terpolymer of claim 1 wherein the acrylic ester component is ethyl acrylate.

4. A terpolymer of claim 1 wherein the acrylic ester component is 2-ethylhexyl acrylate.

5. A terpolymer of claim 1 wherein the allyl alcohol component is allyl alcohol and the acrylic ester component is ethyl acrylate.

6. A terpolymer of claim 1 wherein the allyl alcohol component is allyl alcohol and the acrylic ester component is 2-ethylhexyl acrylate.

7. The process for preparing a terpolymer of an allyl alcohol component, an acrylic ester component and vinyl chloride which comprises mixing the monomers together in the proportions of from 10–70 parts of the allyl alcohol component, from 2–50 parts of the acrylic ester component and from 10–70 parts of vinyl chloride, all parts being parts by weight per 100 parts of total monomers, and heating the mixture at from 80–160° C. under autogenous pressure; said allyl alcohol component being a member of the group consisting of allyl and methallyl alcohol and mixtures thereof and said acrylic ester component being a member of the group consisting of the saturated alkyl esters of acrylic acid and mixtures thereof wherein the alkyl group contains from 1–12 carbon atoms.

8. A coating composition comprising an organic solvent solution of (1) a thermosetting resin taken from the group consisting of phenol-, urea- and melamine-formaldehyde condensation products and (2) a terpolymer of claim 1.

9. A coating composition of claim 8 wherein the thermosetting resin is a butylated melamine-formaldehyde condensation product.

References Cited in the file of this patent

UNITED STATES PATENTS

| | | |
|---|---|---|
| 2,424,838 | Moffett et al. | July 29, 1947 |
| 2,686,172 | Wolf | Aug. 10, 1954 |
| 2,897,174 | Chapin et al. | July 28, 1959 |
| 2,900,359 | Chapin et al. | Aug. 18, 1959 |
| 2,945,835 | Chapin et al. | July 19, 1960 |

FOREIGN PATENTS

| | | |
|---|---|---|
| 590,035 | Great Britain | July 7, 1947 |